Nov. 3, 1964   R. W. ALEXANDER   3,154,846
METHOD OF FORMING A COMPOSITE CONDUCTOR
Filed Aug. 31, 1960   3 Sheets-Sheet 2
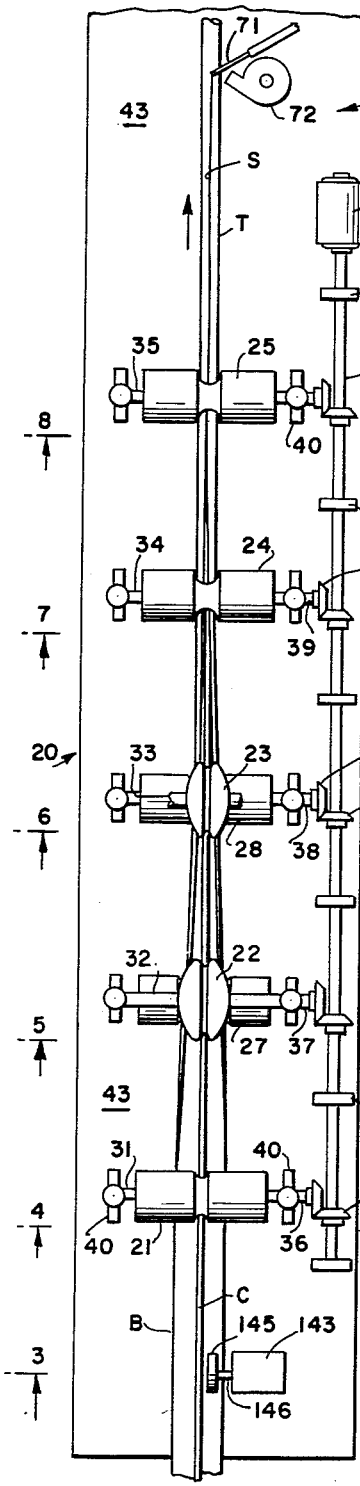
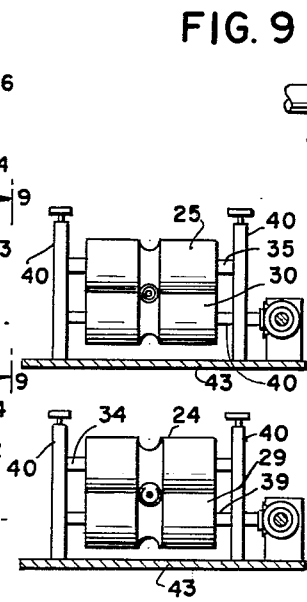
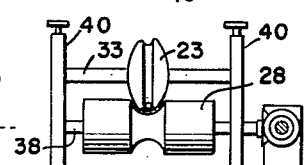
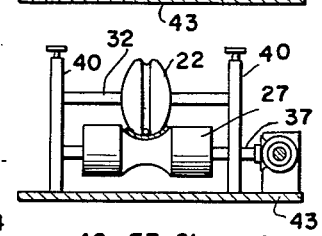
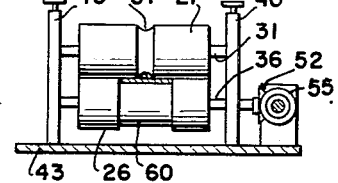
INVENTOR.
ROBERT W. ALEXANDER
BY
ATTORNEYS Nov. 3, 1964   R. W. ALEXANDER   3,154,846
METHOD OF FORMING A COMPOSITE CONDUCTOR
Filed Aug. 31, 1960   3 Sheets-Sheet 3
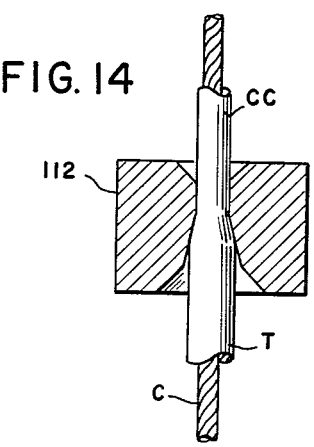
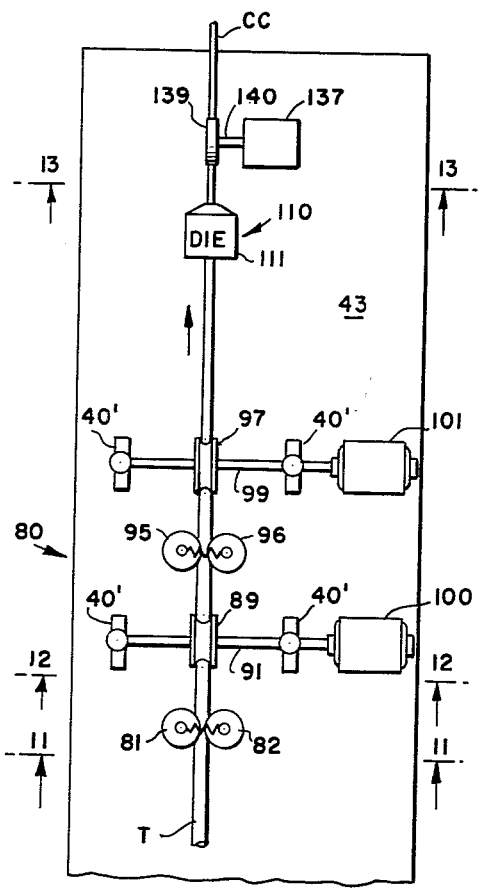
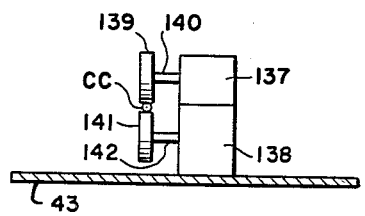
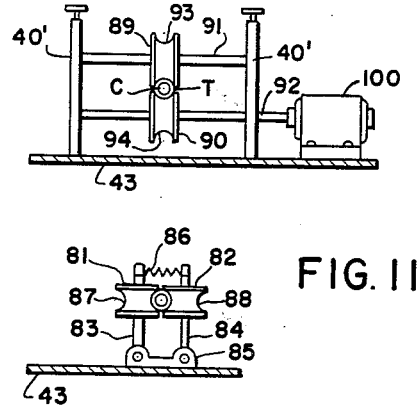
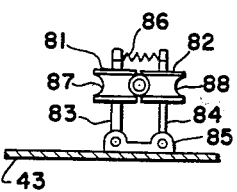
*INVENTOR.*
ROBERT W. ALEXANDER
BY
Adams, Forward and McLean
ATTORNEYS

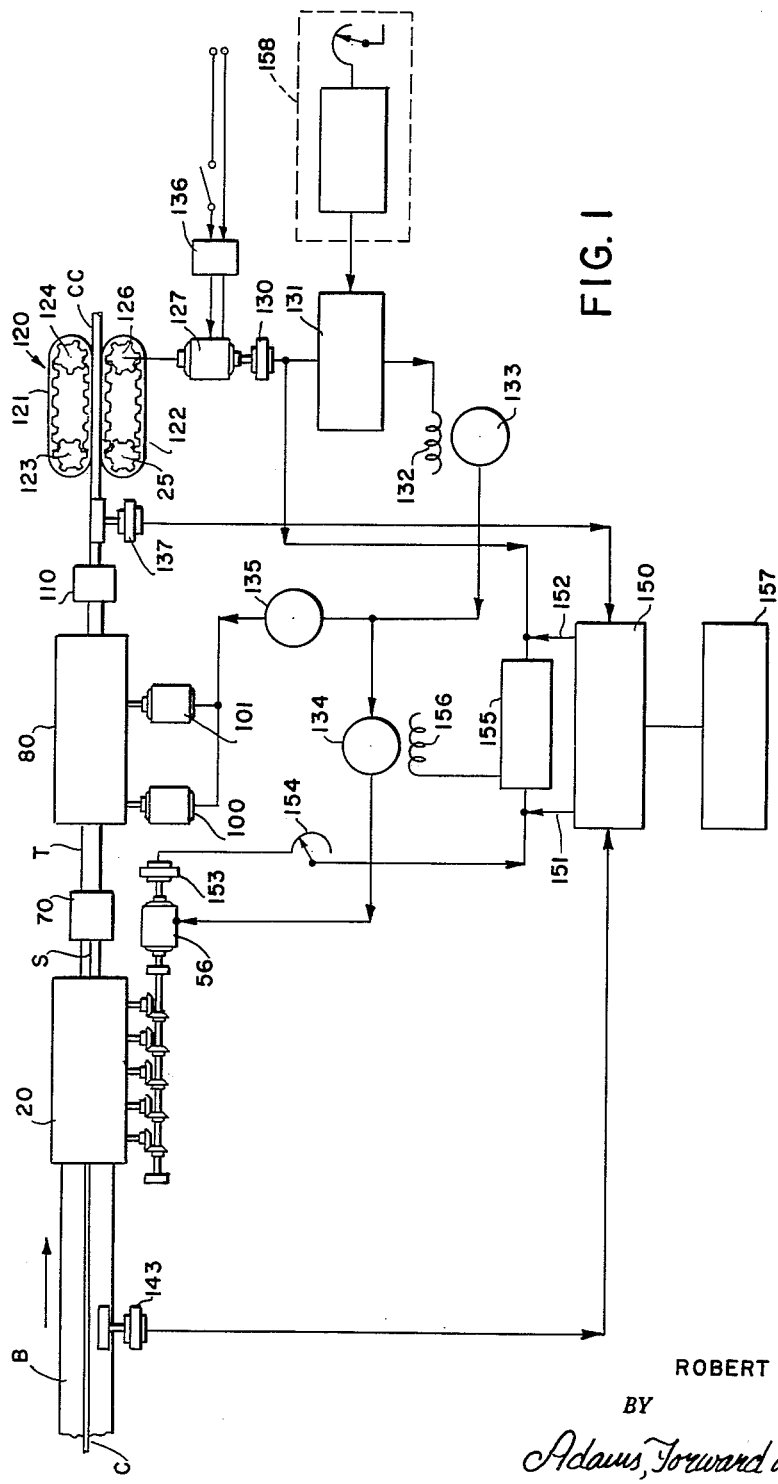

United States Patent Office 3,154,846
Patented Nov. 3, 1964

3,154,846
METHOD OF FORMING A COMPOSITE
CONDUCTOR
Robert W. Alexander, Ayre, Mass., assignor to Simplex
Wire and Cable Company, Cambridge, Mass., a corporation of Massachusetts
Filed Aug. 31, 1960, Ser. No. 53,075
6 Claims. (Cl. 29—470.5)

My invention relates to electrical conductor constructions and in particular provides a method of constructing a composite conductor having a hard core encased in a sheath of relatively softer conductor material.

Where the tensile strength required in an electrical conductor exceeds that obtainable using the relatively more conductive materials, such as copper, and where the electrical conductivity required of the conductor exceeds that obtainable using relatively higher tensile strength materials, such as steel, it has been known to form a composite conductor structure having a core of the relatively stronger, less conductive material encased in a sheath of the relatively weaker, more conductive material to obtain a balance between the tensile strength of the core material and the electrical conductivity of the sheath material. One convenient method of forming such composite conductor structures involves drawing the high tensile strength core in parallel relationship with a tape of the relatively more conductive material. The tape is first folded about the core material to form the tape into a tube in an operation known as "tube forming," typically with the longitudinal edges of the tape abutting. Usually the abutting edges of the tape are thereafter welded, typically employing a non-consumable electrode and an inert gas atmosphere, such as an argon atmosphere. Thereafter the tube, which at that point loosely receives the core, is reduced in diameter usually by means of a reducing mill and a die. In die drawing the final reduction of the sheath material to affix it to the surface of the core material is accomplished.

In composite conductors of this type, such as copper sheathed steel conductors where long lengths are employed, as in submarine cable constructions, it is essential that the electrical characteristics of the composite structure be held uniform. Even though the sheath material is finally affixed to the core by a die drawing operation, it has nevertheless been found that the outside diameter of the composite conductor structure will vary with a consequent variation in the cross-sectional area of the sheath material since the core material typically is incompressible. Since the sheath material has a relatively higher electrical conductivity than the core material, such variation in the cross-sectional area of the sheath has substantial effect upon the electrical conductivity of the composite structure.

It is a particular object of my invention to provide a method for constructing such composite conductor structures which will assure control of the wall thickness, i.e., cross-sectional area, of the sheath material permitting this to be held within close tolerances and thereby assuring uniformity of conductivity of the composite structure along its length.

In order to achieve this object, I contemplate forming the composite conductor structure by drawing the core and sheath material through a tube forming operation and thereafter a reducing operation which terminates in affixing the sheath material to the outer surface of the core. In such an arrangement the sheath, initially in the form of a tape and the core material, which is a solid or stranded wire conductor, are usually drawn from a point following the reducing operation. The tractor or other device employed to draw the composite structure from the tube forming and reducing operations preferably is, as in prior methods of this type, the master speed control of the operation. I have found that uniform thickness of the sheath can be achieved by controlling the linear rate of tube formation in relation to the speed at which the finished, composite conductor is drawn by the tractor to hold the linear rate at which sheath forming material is introduced to the tube forming operation at a fixed ratio with respect to the linear speed at which the core material is introduced.

For a more complete understanding of the practical application of the principles of my invention reference is made to the appended drawings in which;

FIGURE 1 is a schematic diagram of an apparatus suitable for carrying out my invention;

FIGURE 2 is a plan view of a portion of the apparatus shown in FIGURE 1;

FIGURE 3 is a vertical section taken at line 3—3 in FIGURE 2;

FIGURE 4 is a vertical section taken at line 4—4 in FIGURE 2;

FIGURE 5 is a vertical section taken at line 5—5 in FIGURE 2;

FIGURE 6 is a vertical section taken at line 6—6 in FIGURE 2;

FIGURE 7 is a vertical section taken at line 7—7 in FIGURE 2;

FIGURE 8 is a vertical section taken at line 8—8 in FIGURE 2;

FIGURE 9 is an end view as seen at line 9—9 in FIGURE 8;

FIGURE 10 is a plan view of another portion of the apparatus shown in FIGURE 1;

FIGURE 11 is a vertical section taken at line 11—11 in FIGURE 10;

FIGURE 12 is a vertical section taken at line 12—12 in FIGURE 10;

FIGURE 13 is a vertical section taken at line 13—13 in FIGURE 10; and

FIGURE 14 is a cross-section of a portion of the apparatus shown in FIGURE 10.

Referring in particular to FIGURE 1 which shows an apparatus suitable for carrying out the method of my invention it will be noted that such apparatus basically consists of a tube forming machine 20, an arc welding unit 70, a reduction mill 80, a reduction die 110 and a tractor 120, disposed in that sequence along a path with which such components are aligned.

Referring more particularly to FIGURE 2, tube former 20 consists of a series of vertically stacked, horizontally rotatable pairs of cooperating rolls in which the various pairs of rolls are horizontally aligned with one another and mounted parallel to each other. The upper rolls of the series of pairs are denoted in sequence by the reference numerals 21, 22, 23, 24 and 25, respectively, while the lower rolls of the series of pairs are denoted in sequence by the reference numerals 26, 27, 28, 29 and 30, respectively.

The first pair of cooperating rolls in the series, i.e., upper roll 21 and lower roll 26 (see FIGURE 4), are essentially cylindrical in construction and are mounted affixed to axles 31 and 36, respectively, which are vertically aligned in horizontal positions such that the cylindrical surfaces of rolls 21 and 26 are in rolling contact.

The second pair of rolls in the series, that is, rolls 22 and 27 (see FIGURE 5), are similarly mounted affixed to vertically aligned, horizontally positioned axles 32 and 37, respectively. Upper roll 22 of the pair is generally oblate while the lower roll 27 is generally cylindrical.

In the case of the third pair of rolls in the series, of which the upper roll 23 is generally oblate and the lower roll 28 is generally cylindrical (see FIGURE 6), the rolls are mounted on a pair of vertically aligned, horizontally positioned axles 33 and 38, respectively.

The fourth pair of rolls in the series, that is rolls 24 and 29 (see FIGURE 7), are generally cylindrical in shape, and are mounted on a pair of vertically aligned, horizontally positioned axles 34 and 39, respectively.

The last pair of rolls in the series, that is rolls 25 and 30 (see FIGURE 8), which are also generally cylindrical in shape, are similarly mounted affixed to vertically aligned, horizontally positioned axles 35 and 40, respectively.

Associated with each pair of cooperating rolls in tube former 20 are a pair of stands 40 (see FIGURE 9 for example) receiving opposite ends of the pair of axles on which each such pair of cooperating rolls are affixed. Each stand 40 includes a pair of upper-right frame members 41 and 42 mounted on a base 43. Frame members 41 and 42 serve as slide mounts vertically receiving a pair of rectangular plates 44 and 45 to hold such plates vertically aligned while permitting their vertical reciprocation.

Each plate 44 and 45 is centrally apertured to carry suitable journals for receiving the ends of the axles of the roll pair associated with the stand 40. Thus, in the case of rolls 25 and 30, for example, the upper plates 44 in the pair of stands 40 receive the ends of axle 35 while the pair of lower plates 45 receive the ends of axle 40 to support rolls 25 and 30 in their vertically aligned position.

In each case the lower plate 45 of each stand 40 is bottomed against a third plate 46 which is received vertically between upper-right frame members 41 and 42 and which is bottomed on base 43. The upper ends of frame members 41 and 42 in each stand 40 are closed by a cross head 47 which is affixed to the upper ends of frame members 41 and 42 at its ends. Cross head 47 is centrally apertured vertically and a bolt 48 is threadedly received in such aperture. The lower end of bolt 48 carries a collar 49 positioned beneath cross head 47 and a depending guide stud 50. A coil spring 51 is received about guide stud 50 at its upper end which bears against the underside of collar 49. The lower end of spring 51 bears against the upper edge of plate 44 urging plate 44 downwardly. Bolt 48 thus can be employed to adjust the tension placed by spring 51 on plate 44.

Along one side of base 43 each lower axle 36–40, inclusive, extends outwardly through its associated journal plate 45 and carries a bevel gear 52. On the same side of base 43 there is positioned a drive shaft 53 mounted in horizontal position in journals 54 affixed to the upper surface of base 43. Drive shaft 53 extends alongside the series of cooperating roll pairs and carries a series of bevel gears 55 affixed to it which are positioned to engage bevel gears 52 affixed to the ends of axles 36–40, inclusive, providing a common drive for lower rolls 26–30, inclusive. It will be noted that the upper rolls 21–25, inclusive, are idlers. A motor 56 is mounted on base 43 and has its output connected to shaft 53 to drive each of rolls 26–30, inclusive, in the same direction (counterclockwise as seen in FIGURE 9 with respect to roller 30) such that work positioned to be received by the roll pairs between their cooperating surfaces will be carried progressively from roll pairs 21, 26 to roll pairs 22, 27, to roll pairs 23, 28, to roll pairs 24, 29, to roll pairs 25, 30 and thence to arc welding unit 70, which is also mounted on base 43 (see FIGURE 2).

As pointed out above, tube former 20 is essentially intended to take a flat band or tape B of copper or similar soft electrically conductive material and fold such tape B longitudinally into a tube T. To this end each of the rolls 21–30, inclusive, are circumferentially grooved with the grooves in cooperating pairs registering. Since the tape B is to be folded into a tube T enclosing typically a stranded steel conductor C the upper, idler rolls 21, 22 and 23 are provided with circumferential grooves 57, 58 and 59 sized to receive steel conductor C, permitting conductor C to pass rolls 21, 22 and 23 received in such grooves 57, 58 and 59. Associated driven rolls 26, 27 and 28 are provided with circumferential grooves 60, 61 and 62.

Groove 60 of lower roll 26 of the first roll pair is essentially flat bottomed and sized to receive tape B, such that as tape B and steel conductor C pass between rolls 21 and 26 the under surface of conductor C is positioned centrally of and immediately above the upper surface of tape B. Groove 61 in roll 27 of the second pair of cooperating rolls in tube former 20 is provided with a curved, concave bottom such that as tape B passes between rolls 22 and 27 a slight transverse curl is imparted to tape B by the cooperating action of oblate roller 22 which is received in groove 61. Again groove 58 holds steel conductor C centrally positioned immediately over tape B. Groove 62 is similar to groove 61 but is provided with a deeper curved, convex bottom to impart a sharper transverse curl to tape B. Again groove 59 in roller 23 retains steel conductor C centrally over tape B, the longitudinal edges of which at that point are curved upwardly such that the cross-section of tape B is almost semicircular.

At the fourth pair of cooperating rolls 24 and 29, tape B has its longitudinal edges almost closed upon themselves and accordingly the registering grooves 63 and 64 in rolls 24 and 29, the fourth pair, are identical and of semi-circular cross-section. In the fifth pair of rolls, 25 and 30, the longitudinal edges of tape B are closed upon themselves in abutting relationship, such that tape B is in tubular form T with steel conductor C centrally positioned in the tube T. Accordingly, to define this form registering grooves 65 and 66 in rolls 25 and 30 are also identical and of semi-circular cross-section having, however, a smaller diameter than that of grooves 63 and 64 of the fourth pair of rolls 24 and 29 and which is substantially equal to that of tube T.

Tube T containing centrally positioned steel conductor C drawn from the fifth pair of rolls of tube former 20, it will be observed, has longitudinal edges of tape B forming tube T defining a seam S which extends longitudinally of tube T along its upper surface. As tube T is drawn from rolls 25 and 30 it next passes arc welder 70 which is also mounted on base 43 (see FIGURES 1 and 2). Arc welder 70 typically includes an elongated rod-like, non-consumable electrode 71 which is mounted on a suitable stand with its lower end positioned in the path of seam S. A blower 72 mounted on base 43 and having its suction side connected to a source of inert gas, such as argon, is positioned to direct its discharge of inert gas in the vicinity of the lower end of electrode 71 and the upper surface of tube T. Typically the arc welder 70 assembly is enclosed in a hood and provided with a viewing screen. In a conventional manner electrode 71 is connected to a low D.C. voltage source which is grounded with respect to tape B causing the lower end of electrode 71 to strike an arc with the upper surface of tube T along the length of seam S as the latter passes beneath electrode 71 to heat the abutting edges of tube T forming seam S and weld them together.

As the welded tube T leaves arc welder 70 it is thereafter drawn through reduction mill 80 which is also mounted on base 43. Reduction mill 80, as illustrated, includes four pairs of cooperating rolls through which tube T is drawn in sequence. The first pair of cooperating rolls in reduction mill 80 (see also FIGURE 11), i.e., rolls 81 and 82, are rotatably mounted on a pair of axles 83 and 84 which are essentially in vertical position. The lower ends of axles 83 and 84 are pivotally secured in a bracket 85 secured on base 43 permitting axles 83 and 84 to be moved pivotally on horizontal axes parallel to the line of tube T. The upper ends of axles 83 and 84 are secured to the opposite ends of a heavy coil spring 86 which is under substantial tension biasing rolls 81 and 82 toward each other in cooperating contact. Rolls 81 and 82 are further provided with circumferential grooves 87 and 88, respectively, of semi-circular cross-section which register along the line of cooperation of rolls 81 and 82 to define a circular opening slightly less than the diameter of tube T which passes through such opening. In passing rolls 81 and 82, tube T is accordingly slightly reduced in diameter by the action of rolls 81 and 82 and spring 86.

The second pair of cooperating rolls, i.e., rolls 89 and 90, through which tube T is drawn in reduction mill 80 are vertically aligned and mounted for rotation about horizontal axes affixed to vertically aligned, horizontally positioned axles 91 and 92, respectively, the opposite ends of which are received in a pair of stands 40' mounted in upright position on base 43. Stands 40' are essentially identical to stands 40 in tube former 20 except that the compression springs associated with stands 40' corresponding to springs 50 are under far greater compression. Rolls 89 and 90 are circumferentially grooved, as indicated by the reference numerals 93 and 94, such that grooves 93 and 94 are in register along the line of cooperation of rolls 89 and 90. Grooves 93 and 94 are each of semi-circular cross-section of a slightly smaller diameter than the cross-sections of grooves 87 and 88 to define a narrower opening received tubing T, which under the compressive force applied to roll 89 receives a slight reduction in diameter as it passes between rolls 89 and 90.

Reduction mill 80 further includes a third pair of cooperating rolls 95 and 96 mounted similarly to rolls 81 and 82 and provided with registering circumferential grooves of still smaller cross-sectional diameter to impart also further reduction of tube T.

A fourth pair of rolls 97 and 98 (roll 98 is not shown and is positioned beneath roll 97) are also provided in reduction mill 80 mounted in the same manner as rolls 89 and 90 and provided with registering grooves of still further reduced diameter.

In the case of the second and fourth pair of rolls in reduction mill 80 the axles 92 and 99 affixed to the lower rolls 90 and 98 are extended through their mounting frames 40' on one side of base 43 and are directly connected through appropriate reduction gears (not shown) to the output of constant torque D.C. motors 100 and 101, respectively, which drive the lower rolls 90 and 98 in a direction pulling tubing T first through rolls 81 and 82, then through rolls 89 and 90, then through rolls 95 and 96 and lastly through rolls 97 and 98. As tubing T reduced in diameter almost affixed to centrally positioned conductor C is drawn from the fourth pair of rolls 97 and 98 of reduction mill 80, it passes through reducing die 110 which includes a housing 111 which is mounted on base 43 and which retains an annular die 112 (see FIGURE 14). The central aperture of die 112 has a configuration essentially that of a wire drawing die and is sized to force tube T tightly down upon the exterior of steel conductor C to affix tube T as a sheathing on conductor C.

The resultant composite conductor CC is drawn from the operation by means of a caterpillar-type tractor 120 (see FIGURE 1) of conventional design which basically includes upper and lower rubber-shoed, segmented endless treads 121 and 122. Tread 121 is mounted between a pair of wheels 123 and 124, and tread 122 is mounted between a pair of wheels 125 and 126. Wheels 123 and 125 which lead treads 121 and 122 into cooperation along opposite sides of composite conductor CC are idler wheels while wheels 125 and 126 over which treads 121 and 122 leave contact with composite conductor CC to return to wheels 123 and 125, respectively, are commonly driven through a suitable transmission by a motor 127.

In the apparatus described above it will be apparent that tape B and steel conductor C are fed initially through tube former 20 with conductor C positioned immediately above tape B. Suitably steel conductor C is drawn directly from a stranding machine in which it is formed while tape B is drawn from a payoff reel positioned adjacent the first pair of cooperating rolls 21 and 26 of tube former 20. Suitable guide rolls are provided to bring tape B into position immediately beneath conductor C as both conductor C and tape B enter tube former 20. In tube former 20 tape B is folded longitudinally into a tube T enclosing conductor C. Thereafter the longitudinal seam S is closed in arc welder 70, and tube T is then reduced in size in reduction mill 80 almost to the final diameter which is obtained by further reducing tube T in die 110 through which tube T and conductor C are drawn by tractor 120 to form composite conductor CC.

It will be observed that once the sheath material is affixed to conductor C in reducing die 110 the two are drawn together as a unit. Since steel conductor C is essentially incompressible and non-ductile under the working conditions typically provided by the arrangement of apparatus described, tractor 120 is also effective to draw conductor C not only through tube former 20, reduction mill 80 and reducing die 110 but also through the previous stranding operation where this is desirable. Copper tape B, however, being substantially ductile, is only in part drawn by tractor 120 and is in part pushed by tube former 20 and reducing mill 80 through die 110. Those acquainted with the problem will be aware that the ultimate size of the sheath formed by copper tape B on composite conductor CC, both in terms of diameter and wall thickness, will vary despite the fixed diameter of the working surfaces of die 112 by reason of slippages in tube former 20 and reduction mill 80. If tape B is pushed into die 112 at a faster rate than conductor C is drawn through die 112 the thickness of the copper sheathing will be greater than in the case where it is pulled through die 112 at a slower rate than conductor C. As a practical matter, both conditions are utilized in the manufacture of such composite conductors as conductor CC.

The difficulty lies in the inevitable slippages which uncontrollably cause variations in the diameter and wall thickness of the sheathing. It is to this end in particular that my invention is directed. As pointed out above, I have found that if the speed of tube former 20 is controlled in relation to that of tractor 120 such control can be utilized to hold the linear speed of tape B and the linear speed of the composite conductor CC resulting therefrom (and hence of steel conductor C) at any fixed ratio with the result the diameter and wall thickness of the sheath are held uniform within extremely close tolerances.

In order to carry out such speed control of tube former 20 I prefer to utilize an electrical control system in which the speed of tube former 20 and incidentally of reduction mill 80 are made to depend on the speed of tractor 120, in which the linear rates of tape B and composite conductor CC are directly measured and compared, and in which any departure of the ratio of such linear speeds from a predetermined fixed value is utilized to correct the speed of tube former 20 to restore the ratio to the desired predetermined value. Such an arrangement of control circuitry is diagrammatically illustrated in FIGURE 1.

Referring to FIGURE 1, it will be noted that a tachometer generator 130 is connected to the output of tractor motor 127 to provide an indicating voltage output signal responsive to the speed of tractor 120. The output signal from tachometer generator 130 is fed as an input to a high gain amplifier 131, the output of which drives a field coil 132 on a main generator 133 driven by a separate prime mover (not shown) to control the output of generator 133. The output of generator 133 through a booster generator 134 drives motor 56 operating tube former 20 and through a booster generator 135 drives motors 100 and 101 of reduction mill 80 such that the speeds of both tube former 20 and reduction mill 80 generally follow the speed of tractor 120. Tractor 120 is independently controlled by a separate connection of its motor 127 to an external power supply through a speed controller 136 which can be slaved as desired to other operations on an assembly line in which the illustrated apparatus is included.

A tachometer generator 137 mounted on a stand 138 located at the end of base 43 adjacent tractor 120 (see FIGURES 10 and 13) is provided with a rubber-tire wheel 139 connected to its input shaft 140 to drive tachometer generator 137. Wheel 139 is positioned to contact the upper surface of composite conductor CC as it leaves die 110. An idler wheel 141 rotatably mounted on a shaft 142 mounted in stand 138 is positioned immediately beneath composite conductor CC and wheel 139, shaft 142 being resiliently biased upwardly causing wheel 141 to hold conductor CC firmly against wheel 139. A similar tachometer generator 143 (see FIGURES 2 and 3) is mounted on a stand 144 positioned at the opposite end of base 43 adjacent the entrance of tape B and conductor C into the first pair of rolls 21 and 26 of tube former 20. Tachometer generator 143 has a rubber-tire wheel 145 mounted on its input shaft 146 to drive tachometer 143. Wheel 145 is positioned to ride on the upper surface of tape B. Stand 144 beneath wheel 145 carries an idler wheel 146 rotatably mounted on a shaft 147 retained in stand 144. Wheel 146 is positioned to ride on the under surface of tape B immediately beneath wheel 145 and shaft 147 and is resiliently biased upwardly to cause wheel 146 to hold tape B firmly against tachometer generator wheel 145.

Referring again to FIGURE 1 the output signals of tachometer generators 137 and 143 are connected as opposing inputs to a comparator circuit 150, which is connected to provide a first corrective signal in one output circuit 151 in the event the ratio of output signals of tachometer signals of tachometer generators 137 and 143 falls below a predetermined value and to deliver a second corrective signal in a second output circuit 152 in the event such ratio of signals exceeds such predetermined value. Comparator circuit 150 can also desirably include an integrating circuit for totalizing departures of the signals of generators 137 and 143 and desirably also includes a decimal read out indicator 157 providing instantaneous indication of the ratio.

Motor 56 driving tube former 20 also drives a tachometer generator 153 having an output signal proportional to the speed of the motor 56 which is connected through a manually operable potentiometer 154 as an input to a high gain amplifier 155. Output circuit 151 of comparator 150 is connected to the same input of amplifier 155 to supplement the signal from tachometer generator 153. The output of tachometer generator 130 driven by motor 127 of tractor 120 is also connected as a second input to amplifier 155 to which second input output circuit 152 of comparator 150 is also connected to supplement the output signal of generator 130. Amplifier 155 compares its input signals and in its output circuit drives a field winding 156 associated with generator 134 in the power circuit for tube former motor 56. Coil 156 is energized to decrease the power supply to motor 56 upon an increase in signal to the first input of amplifier 155 (from generator 153 and output circuit 151) and to increase such power supply upon an increase in signal to its second input (from generator 130 and output circuit 152).

A primary speed control for the main generator 133 is provided by connecting a manually or otherwise externally operable reference voltage control circuit 158 which is connected as an input to high gain amplifier 131 bucking the input signal supplied to amplifier 131 by generator 130 associated with tractor 120.

In operation it will be evident that tractor 120 runs independently of the rest of the system and is the master speed control for the entire operation and that reduction mill 80 follows the tractor subject only to the control imposed by reference voltage circuit 158 which generally predetermines the speed of tape B in relation to the speed at which composite conductor CC is formed.

Potentiometer 154 is adjusted to balance the input signal from tachometer generator 153 connected to amplifier 155 with the input signal from tachometer generator 130 to a position at which indicator 157 instantaneously shows the desired speed ratio between tape B and composite conductor CC has been established.

In accordance with my invention tachometer generators 137 and 143 provide an automatic control system for superimposing a corrective signal upon the primary control system unbalancing the inputs to amplifier 155 whenever linear rates of tape B and composite conductor CC deviate from the predetermined desired ratio. The corrective signal, as suggested by the preceding description of FIGURE 1, controls the speed of motor 56 and hence of former 20 in relation to that of tractor 120 to restore the desired ratio of linear rates of speed of tape B and composite conductor CC. Thus, for example, assuming a ratio of tape linear speed to composite conductor linear speed of 1.50 has been predetermined to provide the proper copper wall thickness. If the ratio falls to 1.49 the input from tachometer generator 143 to comparator 150 relative to that of generator 137 to comparator 150 will correspondingly drop causing a corrective signal to be introduced to amplifier 155 through output circuit 152 of comparator 150 increasing the speed of motor 56, thus increasing the tape speed until the output voltage of tachometer generators 137 and 143 are again in a ratio indicating the relative linear speeds of tape B and composite conductor CC are restored to 1.50.

While I have described my invention with reference to a particular conductor construction, it will be apparent that it is generally applicable to the construction of any hard-core, elongated product which is to be covered with a relatively softer and more ductile material employing a tube forming operation followed by a reducing operation to affix the tube of softer material to the hard core. While I have also described my method utilizing tractor drawing the composite conductor as the master speed control to which the tube forming is slaved it will be apparent that the reverse arrangement is a full equivalent, although less preferable as the tractor is desirably also employed to control other operations such as stranding of the steel conductor core. It will also be apparent that while I have compared the speed of copper tape feed with the speed of composite conductor withdrawal the latter speed is the full equivalent of the steel core feed which can be suitably substituted.

I claim:

1. In the method of forming a composite conductor having a core of relatively hard, non-ductile material and a sheath of relatively softer and more ductile material affixed about said core which includes drawing through a given path an indefinite length of said core material in the form of elongated body and an indefinite length of said sheathing material initially in the form of a tape, and acting on said sheathing material in sequence along said path, first to form said tape into a tube enclosing said core by folding said tape lengthwise about said core using rollers that both feed and form the tape and joining the edges formed thereby, and secondly using a drawing die to reduce said tube to affix said sheath about said core, the improvement which includes controlling the rate of acting on said tape, first to form said tube and second to reduce said tube in relation to the rate at which said conductor is drawn from the drawing die reducing said tube to hold the linear rate of said sheathing material in tape form entering said given path in a fixed ratio with respect to the linear rate at which said conductor is withdrawn from said given path.

2. The improvement according to claim 1 in which said core material is steel and said sheath material is copper.

3. The improvement according to claim 2 in which steel core is in the form of stranded wire.

4. In the method of forming a composite conductor having a core of relatively hard, non-ductile material and a sheath of relatively softer and more ductile material affixed about said core which includes passing an indefinite length of said core in the form of an elongated body and an indefinite length of said sheathing material in the form of a tape first through a series of feeding and forming rollers wherein the tape is formed into the form of a tube about the said core and the seam formed thereby is welded and second through a reducing process of which at least one step requires passing the tube and core through a die to affix said tube to said core, the improvement which includes controlling the rate of passing said sheathing material through said rollers in relation to the rate at which said conductor is drawn from said die to hold the linear rate of said sheathing material in tape form entering said rollers in a fixed ratio with respect to the linear rate at which said conductor is withdrawn from said die.

5. The improvement according to claim 4 in which said core material is steel and said sheathing material is copper.

6. The improvement according to claim 5 in which steel core is in the form of stranded wire.

References Cited in the file of this patent

UNITED STATES PATENTS

| 1,794,902 | Johnson | Mar. 3, 1931 |
| 2,063,470 | Staples | Dec. 8, 1936 |
| 2,975,087 | Donald | Mar. 14, 1961 |

FOREIGN PATENTS

| 137,860 | Switzerland | Apr. 16, 1930 |